US012016093B2

(12) United States Patent
Kasetani et al.

(10) Patent No.: US 12,016,093 B2
(45) Date of Patent: Jun. 18, 2024

(54) SHEET HEATER, AND WINDSHIELD DEVICE FOR VEHICLE

(71) Applicants: NIFCO INC., Kanagawa-ken (JP); KURABE INDUSTRIAL CO., LTD., Shizuoka-ken (JP)

(72) Inventors: Yasuki Kasetani, Kanagawa-ken (JP); Toshikazu Nagai, Shizuoka-ken (JP); Tatsunori Suzuki, Shizuoka-ken (JP)

(73) Assignees: NIFCO INC., Kanagawa-ken (JP); KURABE INDUSTRIAL CO., LTD., Shizuoka-ken (JP)

( * ) Notice: Subject to any disclaimer, the term of this patent is extended or adjusted under 35 U.S.C. 154(b) by 391 days.

(21) Appl. No.: 16/954,703

(22) PCT Filed: Dec. 20, 2018

(86) PCT No.: PCT/JP2018/047005
§ 371 (c)(1),
(2) Date: Jun. 17, 2020

(87) PCT Pub. No.: WO2019/124498
PCT Pub. Date: Jun. 27, 2019

(65) Prior Publication Data
US 2021/0092803 A1    Mar. 25, 2021

(30) Foreign Application Priority Data
Dec. 21, 2017  (JP) .................................. 2017-244586

(51) Int. Cl.
*H05B 3/84*    (2006.01)
*B60S 1/02*    (2006.01)
(Continued)

(52) U.S. Cl.
CPC ................ *H05B 3/84* (2013.01); *B60S 1/02* (2013.01); *H05B 3/12* (2013.01); *H05B 3/34* (2013.01);
(Continued)

(58) Field of Classification Search
CPC ............... B60S 1/02; H05B 2203/003; H05B 2203/016; H05B 3/12; H05B 3/34; H05B 3/84
See application file for complete search history.

(56) References Cited

U.S. PATENT DOCUMENTS 8,022,334 B2 *  9/2011  Baumler ........... B32B 17/10385
                                            219/541
9,677,177 B2 *  6/2017  Tiner ...................... C23C 16/50
(Continued)

FOREIGN PATENT DOCUMENTS

JP    S55119383 A    9/1980
JP    S5744985 A     3/1982
(Continued)

OTHER PUBLICATIONS

Machine translation of JP-2010003487: Matsuoka, Long strip-shaped resistance heating element and planar heater, 2008 (Year: 2008).*
(Continued)

*Primary Examiner* — Janie M Loeppke
*Assistant Examiner* — Abigail H Rhue
(74) *Attorney, Agent, or Firm* — ITAROLLI, SUNDHEIM, COVELL & TUMMINO L.L.P.

(57) ABSTRACT

A sheet heater comprises a sheet form heating unit configured from a wire heater. The heating unit comprises a first heating unit positioned along a peripheral edge of the area subject to heating, and a second heating unit positioned at an area surrounded by the first heating unit. The second heating
(Continued)

unit comprises a plurality of meandering parts, with mutually adjacent meandering parts overlapping each other in the meandering direction. In the heating unit, the width (WL) of the wire heater is greater than the width (WP) between mutually adjacent wire heaters.

12 Claims, 3 Drawing Sheets

(51) Int. Cl.
 *H05B 3/12* (2006.01)
 *H05B 3/34* (2006.01)
(52) U.S. Cl.
 CPC .. *H05B 2203/003* (2013.01); *H05B 2203/016* (2013.01)

(56) References Cited

U.S. PATENT DOCUMENTS

| | | | |
|---|---|---|---|
| 11,485,323 B2 * | 11/2022 | Ooji | H05B 3/84 |
| 2005/0109771 A1 | 5/2005 | Bower et al. | |
| 2009/0014426 A1 | 1/2009 | Peter | |
| 2013/0277352 A1 | 10/2013 | Degen et al. | |
| 2013/0314540 A1 * | 11/2013 | Hacker | B60J 1/002 348/148 |

FOREIGN PATENT DOCUMENTS

| | | |
|---|---|---|
| JP | H119027 Y2 | 6/1989 |
| JP | H11141900 A | 5/1999 |
| JP | 3125136 | 8/2006 |
| JP | 2007511052 A | 4/2007 |
| JP | 2007115610 A * | 5/2007 |
| JP | 2007517360 A | 6/2007 |
| JP | 2010003487 A5 * | 6/2008 |
| JP | 2014502408 A | 1/2014 |
| JP | 2017185896 A | 10/2017 |

OTHER PUBLICATIONS

Machine translation of JP-2007115610: Hayashi, Planar Heating Elements, 2005 (Year: 2005).*
International Search Report for PCT/JP2018/047005 dated Mar. 19, 2019.

* cited by examiner

SHEET HEATER, AND WINDSHIELD DEVICE FOR VEHICLE

RELATED APPLICATIONS

The present invention is a U.S. National Stage under 35 USC 371 patent application, claiming priority to Serial No. PCT/JP2018/047005, filed on 20 Dec. 2018; which claims priority of JP 2017-244586, filed on 21 Dec. 2017, the entirety of both of which are incorporated herein by reference.

TECHNICAL FIELD

The present disclosure relates to a planar heating element installed in a vehicle windshield device that is attached to a windshield of a vehicle and to a vehicle windshield device.

BACKGROUND ART

A vehicle windshield device is attached to the passenger compartment side of a windshield and used to detect other vehicles or obstacles in front of the vehicle. The vehicle windshield device includes a bracket fixed to the windshield, a camera unit supported by the bracket, and a light-shielding hood that shields the camera unit from external light such as sunlight. When the humidity in the passenger compartment is high or the temperature outside the vehicle is low, water, frost, or ice caused by condensation collects on the windshield. The vehicle windshield device includes a planar heating element that heats the light-shielding hood on the rear surface of the light-shielding hood. Heat generated by the planar heating element removes water, frost, and ice, which are caused by condensation, from where the windshield is opposed to the light-shielding hood so that the results captured by the camera unit are clear (refer to Patent Document 1).

One example of a planar heating element includes a first strip-like heating element and a second strip-like heating element that are separate from each other to uniformly raise the temperature of a heating planar target area. The first strip-like heating element is located at the edge of the target area, and the second strip-like heating element is located inside the target area (refer to Patent Document 2). Another example of a planar heating element includes a strip-like heating element meandered over the entire target area to heat a wide range with a small number of strip-like heating elements (refer to Patent Document 3).

PRIOR ART DOCUMENTS

Patent Documents

Patent Document 1: Japanese Laid-Open Patent Publication No. 2017-185896
Patent Document 2: Japanese Registered Utility Model No. 1801190
Patent Document 3: Japanese Registered Utility Model No. 3125136

SUMMARY OF THE INVENTION

Problems that the Invention is to Solve

One example of the planar heating element described above separately heats the first strip-like heating element located at the edge of the target area and the second strip-like heating element located inside the target area to allow for a uniform temperature in the planar target area. In the other example of the planar heating element described above, meandering sections arranged next to each other are superposed in the meandering direction to allow for improvement in rigidity of the planar heating element. The planar heating element in these cases is further required to promptly raise the temperature of the target area to a target temperature, that is, improve the heating responsiveness of the planar target area when driving of the planar heating element is started in addition to the uniform temperature and the improvement in rigidity.

It is an objective of the present disclosure to provide a planar heating element that improves heating responsiveness and a vehicle windshield device.

Means for Solving the Problems

In one general aspect, a planar heating element is provided. The planar heating element includes a planar heating unit formed by a strip-like heating element. The heating unit includes a first heating segment located along an edge of a heating target area, and a second heating segment located in an area surrounded by the first heating segment. The second heating segment includes a plurality of meandering sections. The meandering sections arranged next to each other are superposed in a meandering direction. The strip-like heating element has a width that is greater than a width between parts of the strip-like heating element that are arranged next to each other.

With the planar heating element, the strip-like heating element of the first heating segment continuously extends along the edge of the heating target area, and the first heating segment generates heat. Further, in the area surrounded by the first heating segment, the meandering sections of the second heating segment are spaced apart, and the second heating segment generates heat. Thus, heat dissipation is limited at where heat easily dissipates outward such as the edge of the heating target area. As a result, the temperature is uniform in the heating target area. In the second heating segment, the meandering sections arranged next to each other are superposed in the meandering direction. This improves the rigidity of a less rigid portion such as the meandering sections arranged next to each other. Further, the width of the strip-like heating element is greater than the width between the parts of the strip-like heating element. This increases the amount of heat generated per unit area and improves the heating responsiveness of the heating target area.

In the planar heating element, a material forming the strip-like heating element may be stainless steel. In this case, the stainless steel improves the rigidity of the strip-like heating element compared with materials such as aluminum, nickel, and copper.

The planar heating element may further include an elastic sheet that is heat insulative, and the strip-like heating element may be adhered to the elastic sheet. In this case, when a thermal fuse is located between the strip-like heating element and the elastic sheet, the elastic sheet is deformed in conformance with the shape of the thermal fuse to limit deformation of the strip-like heating element. Further, when the planar heating element is assembled to, for example, the rear surface of a light-shielding hood, the elastic sheet is deformed in conformance with the shape of a bracket to allow the planar heating element to be assembled to the bracket. This improves the assembling characteristics of the planar heating element as a result.

In the planar heating element, the strip-like heating element may include a first end and a second end that supply current to the strip-like heating element, the first end and the second end may be located in the first heating segment, and the first end and the second end may be spaced apart from each other at a part of the edge. In the planar heating element, the ends of the strip-like heating element are located in the first heating segment. In other words, the strip-like heating element is laid out from a part of the edge of the heating target area into the heating target area and then out of the heating target area. This allows the ends that supply current to the heating unit to be concentrated at a single location. Thus, the structure required to connect the heating unit to the circuit that supplies current to the heating unit is simplified.

In the planar heating element, the width between the parts of the strip-like heating element that are arranged next to each other may be 0.4 mm or greater to 0.6 mm or less, and the width of the strip-like heating element may be 1.4 times or greater to 1.6 times or less than the width between the parts of the strip-like heating element that are arranged next to each other. In this case, when the heating unit is manufactured, stable dimensional precision is obtained by etching a metal foil or stamping out a metal foil.

A vehicle windshield device for solving the above problems includes a bracket attached to a windshield of a vehicle, a camera unit accommodated in the bracket, a light-shielding hood accommodated in the bracket, and the above planar heating element configured to heat the light-shielding hood. The vehicle windshield device improves the heating responsiveness of the heating target area to improve the driving responsiveness of the vehicle windshield device.

MODES FOR CARRYING OUT THE INVENTION

A planar heating element and a vehicle windshield device according to one embodiment will now be described below. One example of the vehicle windshield device will be described with reference to FIGS. 1 and 2, and one example of the planar heating element will be described with reference to FIGS. 3 to 5.

Vehicle Windshield Device

Figure 1:
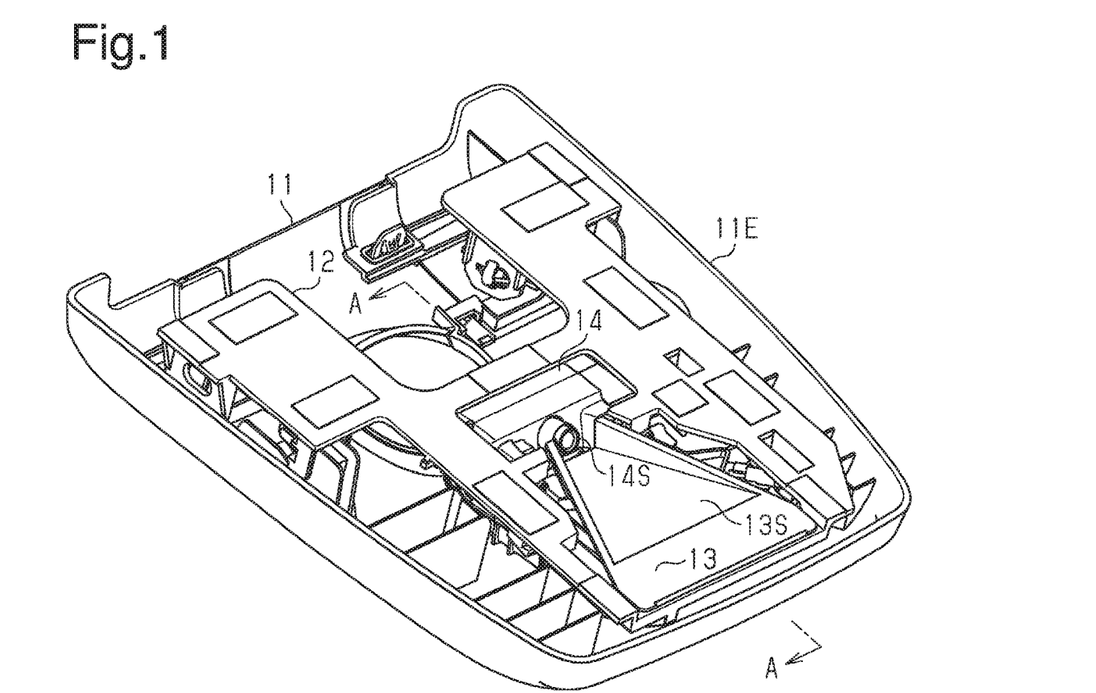
FIG. 1 is a perspective view of a vehicle windshield device according to one embodiment.

As shown in FIG. 1, a vehicle windshield device includes a bracket 11, a camera frame 12, a light-shielding hood 13, and a camera unit 14.

The bracket 11 is a bowl-shaped plastic member and accommodates the camera frame 12, the light-shielding hood 13, and the camera unit 14. The bracket 11 is attached to a windshield WG (refer to FIG. 2) of a vehicle so that an edge 11E of the bracket 11 faces the passenger compartment side of the windshield WG.

The camera frame 12 is a flat plastic member. The camera frame 12 extends along the windshield WG. The camera unit 14 is arranged between the camera frame 12 and the bracket 11. A light-receiving element 14S of the camera unit 14 is exposed from the camera frame 12 toward the windshield WG. The camera frame 12 supports the camera unit 14 and is fitted to the bracket 11.

The light-shielding hood 13 is a black plastic member having the shape of a trapezoidal plate as viewed from the windshield WG. The light-shielding hood 13 determines the range of light received by the light-receiving element 14S of the camera unit 14. The light-shielding hood 13 includes a light-shielding sheet 13S on the surface of the light-shielding hood 13 that faces the windshield WG. The light-shielding sheet 13S is a black trapezoidal sheet such as nonwoven fabric adhered to the surface of the light-shielding hood 13. The light-shielding sheet 13S scatters external light such as sunlight or street lighting to reduce the external light entering the light-receiving element 14S of the camera unit 14. The light-shielding sheet 13S has substantially the same shape as a heating target area.

When the humidity in the passenger compartment is high or the temperature outside the vehicle is low, water, frost, or ice caused by condensation collects on the windshield WG. Water, frost, or ice caused by condensation reflects and scatters light from a vehicle located in front of the subject vehicle or light from an obstacle located in front of the subject vehicle. The vehicle windshield device includes a planar heating element 20 (refer to FIG. 2) on the rear surface of the light-shielding hood 13 to heat the light-shielding hood 13 and remove water, frost, and ice caused by condensation so that a vehicle located in front of the subject vehicle or an obstacle located in front of the subject vehicle can be detected with high accuracy. The rear surface of the light-shielding hood 13 is curved, for example, to project gradually toward the windshield WG. The rear surface of the light-shielding hood 13 is heated by the planar heating element 20.

Figure 2:
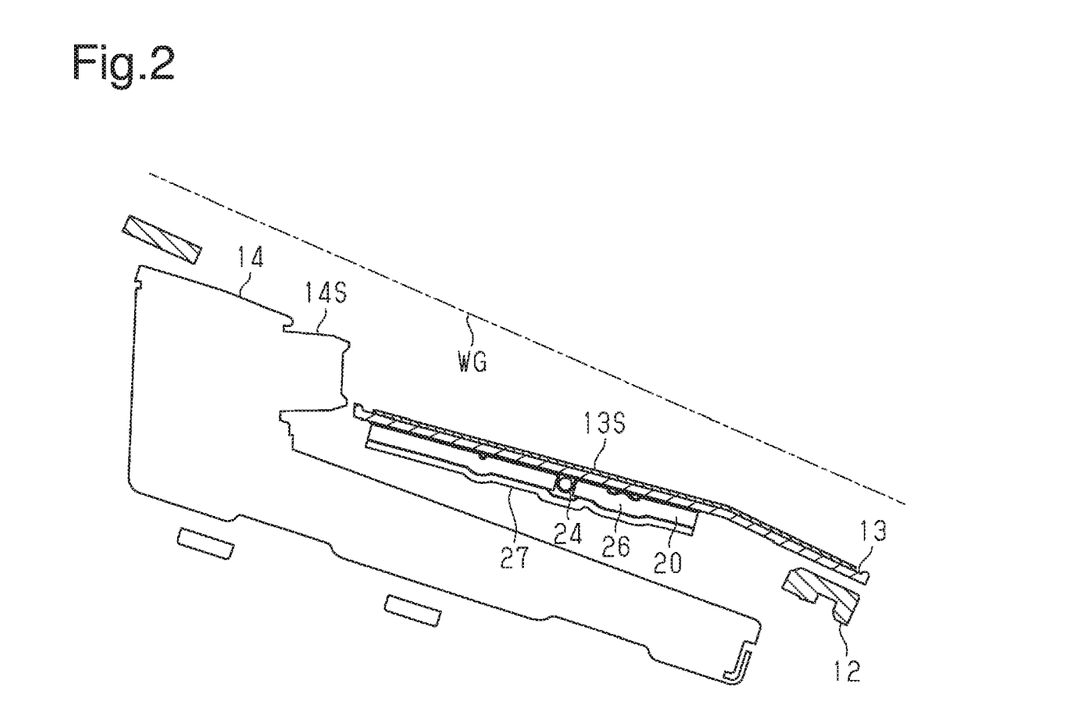
FIG. 2 is a cross-sectional view taken along line A-A in FIG. 1 showing where a planar heating element is located.

The light-receiving element 14S of the camera unit 14 is directed toward the windshield WG from the light-shielding sheet 13S (refer to FIG. 2). The camera unit 14 receives, through the windshield WG, reflection light from an object located frontward from the camera unit 14. The range of light that the light-receiving element 14S receives is determined by the angle of view of the lens of the light-receiving element 14S and the shape of the light-shielding hood 13.

Planar Heating Element

Figure 3:
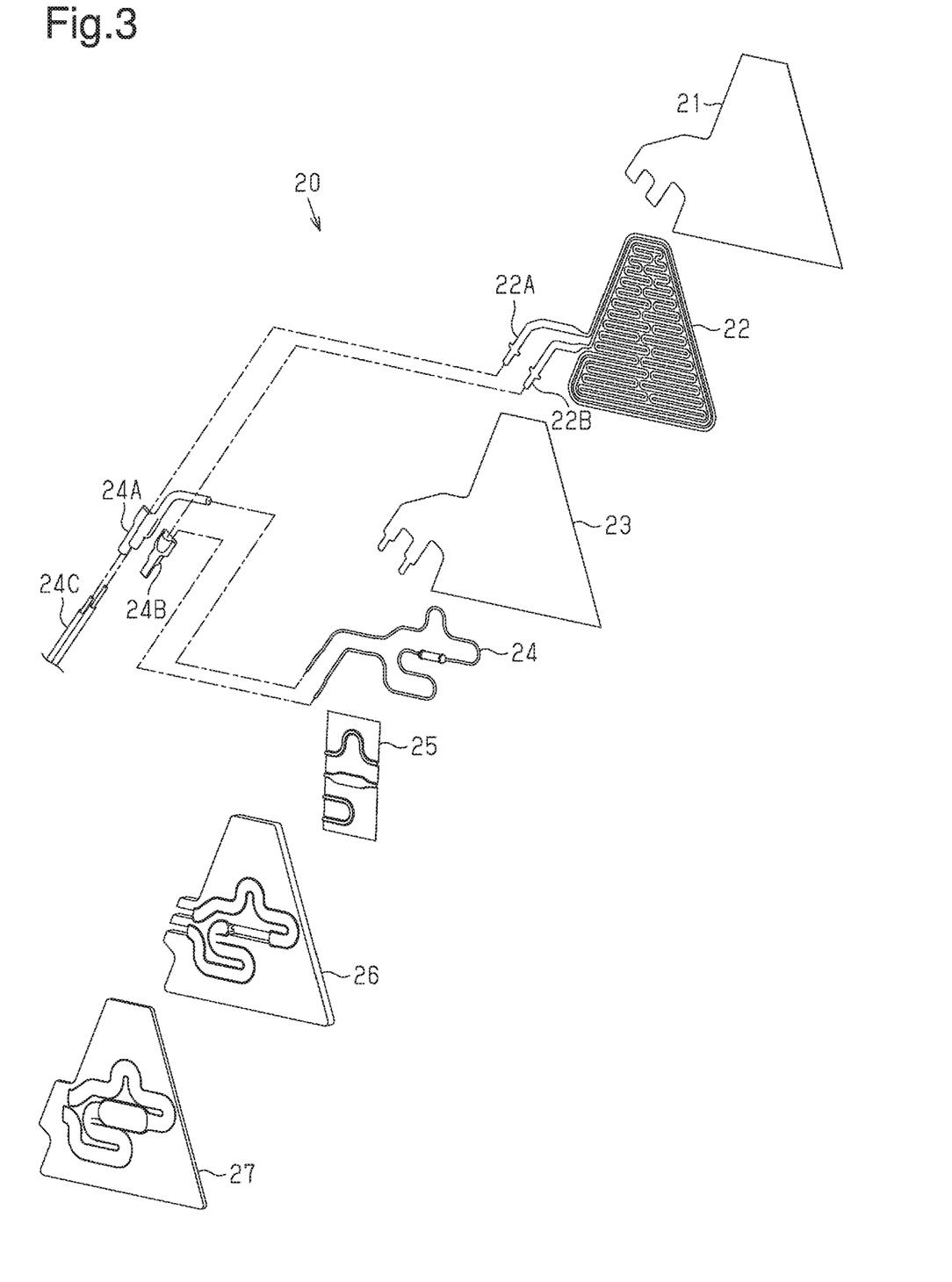
FIG. 3 is an exploded perspective view showing the laminated structure of a planar heating element according to one embodiment.

As shown in FIG. 3, the planar heating element 20 includes a front insulating sheet 21, a heating unit 22, a rear insulating sheet 23, a protective circuit 24, a fixing tape 25, a first elastic sheet 26, and a second elastic sheet 27. To facilitate description of the laminated structure of the planar heating element 20, the surface of the planar heating element 20 that faces the light-shielding hood 13 (toward windshield WG) will be referred to as the front side and the surface opposite to the front side will be referred to as the rear side.

The front insulating sheet 21 is insulative, heat resistant, and impact resistant at working temperatures of the planar heating element 20. The working temperatures of the planar heating element 20 is, for example, −50° C. or higher to 140° C. or lower. The front insulating sheet 21 protects the electric characteristics of the heating unit 22 by electrically insulating the heating unit 22 from other conductors arranged on the front side of the heating unit 22. Further, the front insulating sheet 21 protects the mechanical characteristics of the heating unit 22 by reducing the impact transmitted from the front side of the planar heating element 20 to the heating unit 22.

The front insulating sheet 21 is a polyimide sheet having a thickness of, for example, 0.1 mm. The rear surface of the front insulating sheet 21 (surface shown in FIG. 3) includes an adhesive. The rear surface of the front insulating sheet 21 is bonded to the heating unit 22 and the rear insulating sheet 23. The adhesive on the rear surface of the front insulating sheet 21 is, for example, a silicone adhesive that is insulative and heat resistant.

The heating unit 22 includes a single strip-like heating element. The strip-like heating element of the heating unit 22 is in conformance with the rear surface of the front insulating sheet 21. The outermost edge of the heating unit 22 determines the contour of a heating target area in a plan view. The target area is where the heating unit 22 is located in a plane on which the heating unit 22 extends. The size of the target area is, for example, 15 cm$^2$.

The strip-like heating element of the heating unit 22 is, for example, band-shaped and formed from SUS304 with a thickness of 0.03 mm. A first end 22A, which serves as one end of the strip-like heating element, is connected to one of two lead wires 24C through a heat-shrinkable tube 24A. A second end 22B, which serves as another end of the strip-like heating element, is accommodated in a heat-shrinkable tube 24B and connected to the protective circuit 24. The heating unit 22 is supplied with current through the lead wires 24C to generate rated heat. The rated heat generated by the heating unit 22 is, for example, 0.5 W/cm$^2$.

The rear insulating sheet 23 is insulative and heat resistant at the working temperatures of the planar heating element 20. The rear insulating sheet 23 protects the electric characteristics of the heating unit by electrically insulating the heating unit 22 from other conductors. The rear insulating sheet, which is thinner than the front insulating sheet, is a polyimide sheet having a thickness of, for example, 0.03 mm.

The protective circuit 24 regulates the current flowing through the planar heating element 20 in a predetermined range. The protective circuit 24 includes a thermal fuse. One end of the thermal fuse is accommodated in the heat-shrinkable tube 24B and connected to the second end 22B of the heating unit 22. Another end of the thermal fuse is connected to the other one of the two lead wires 24C.

The heating unit 22 and the protective circuit 24 are connected to an external circuit by the lead wires 24C. The heating unit 22 and the lead wires 24C are securely connected by the heat-shrinkable tubes 24A, 24B when the heat-shrinkable tubes 24A, 24B are shrunk. The fixing tape 25 fixes the protective circuit 24 to the rear insulating sheet 23. The fixing tape 25 is, for example, a polyimide tape that is insulative and heat resistant.

The first elastic sheet 26 is heat insulative, waterproof, slip-proof, and the like at the working temperatures of the planar heating element 20. The first elastic sheet 26 may be a foamed plastic sheet or a rubber sheet. The first elastic sheet 26, which is more impact absorbent than the second elastic sheet 27, is, for example, a flame retardant urethane sheet having a thickness of 2 mm. The first elastic sheet 26 is in contact with the rear insulating sheet 23 and the second elastic sheet 27 and also in contact with the fixing tape 25 and the second elastic sheet 27.

The second elastic sheet 27 is heat insulative, impact resistant, and the like at the working temperatures of the planar heating element 20. The second elastic sheet 27 may be a foamed plastic sheet or a rubber sheet. The second elastic sheet 27 has higher moisture impermeability than the first elastic sheet 26. The second elastic sheet 27 is a dustproof polyolefin foamed sheet having a thickness of, for example, 1 mm.

Figure 4:
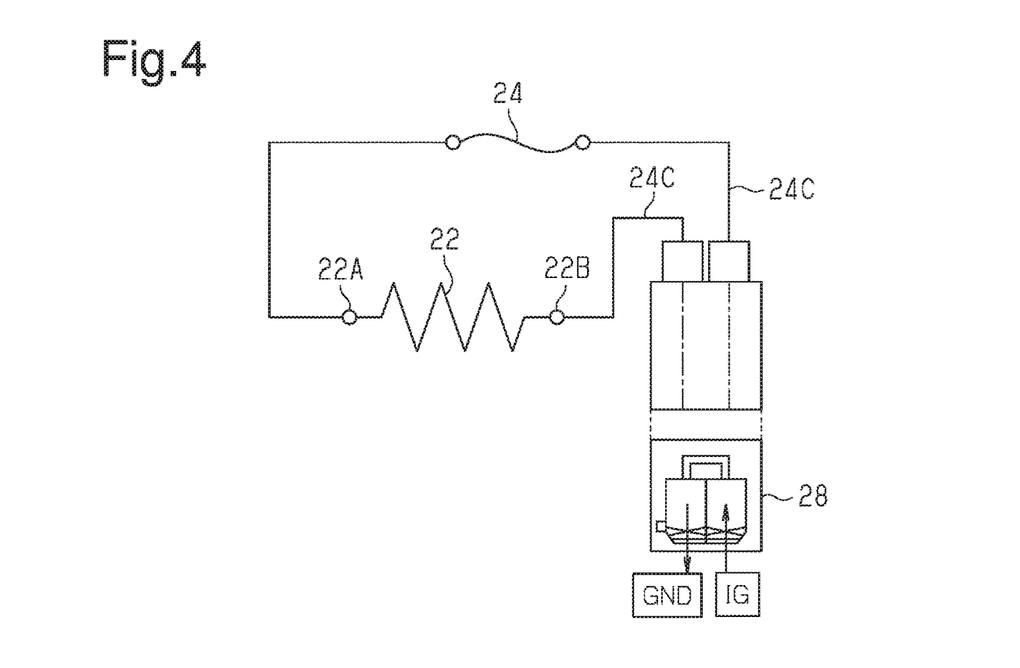
FIG. 4 is a circuit diagram showing the connection of a heating unit and a thermal fuse.

As shown in FIG. 4, the heating unit 22 and the protective circuit 24 are connected in series to form a single series circuit. The series circuit has an input terminal connected to an external connector 28 by one of the lead wires 24C and an output terminal connected to the external connector 28 by the other one of the lead wires 24C. One terminal of the external connector 28 is connected to a ground potential and another terminal of the external connector is connected to an ignition power supply.

Heating Unit 22

Figure 5:
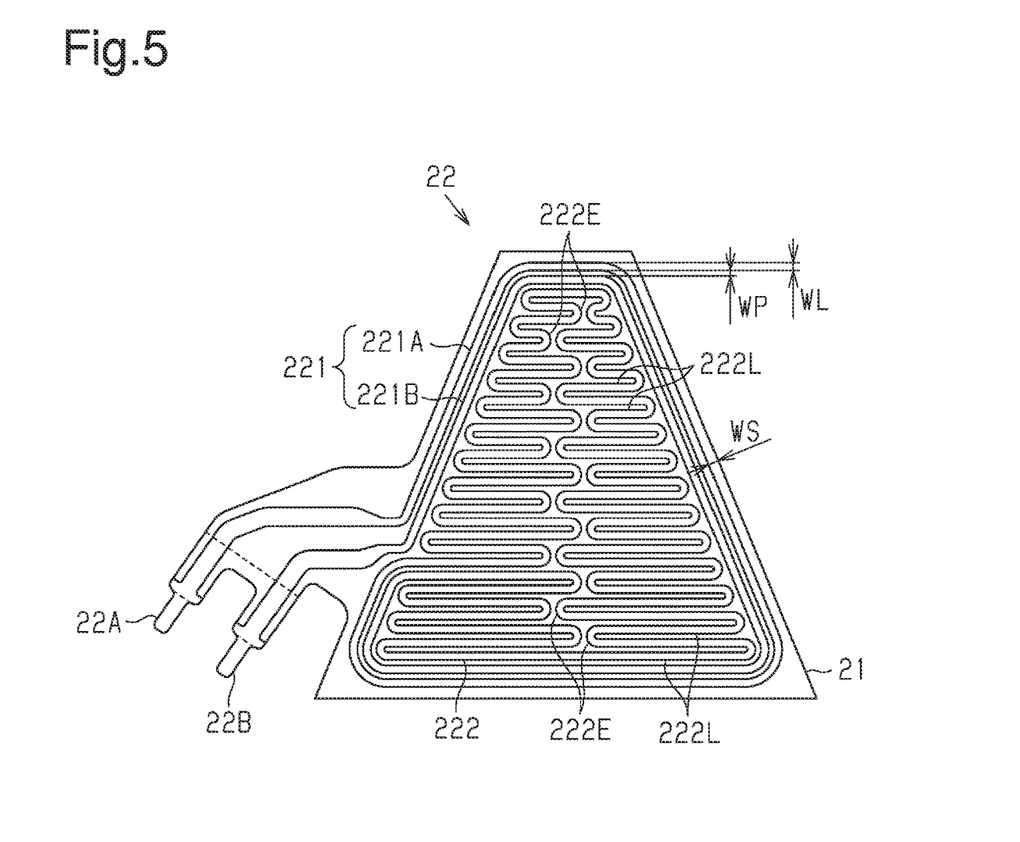
FIG. 5 is a plan view showing the configuration of a strip-like heating element of the heating unit.

As shown in FIG. 5, the heating unit 22 includes a first heating segment 221 and a second heating segment 222. The first heating segment 221 and the second heating segment 222 share a single strip-like heating element. That is, part of the single strip-like heating element of the heating unit 22 forms the first heating segment 221 and the remaining part forms the second heating segment 222.

The first heating segment 221 is laid out so as to be wound twice along the edge of the heating target area. The first heating segment 221 is trapezoidal in conformance with the edge of the target area. The first heating segment 221 includes an outer portion 221A and an inner portion 221B.

The outer portion 221A is located outward from the inner portion 221B and located at the outermost portion of the first heating segment 221. The outer portion 221A is located inward from the edge of the front insulating sheet 21 when viewed in a direction orthogonal to the front insulating sheet 21. A distance WS between the edge of the outer portion 221A and the edge of the front insulating sheet 21 is, for example, 1 mm. The shape of the outer portion 221A is substantially similar to the shape of the inner portion 221B. The distance between the outer portion 221A and the inner portion 221B is substantially fixed over the entire periphery of the first heating segment 221.

The first end 22A and the second end 22B of the strip-like heating element supply current to the strip-like heating element. The ends 22A and 22B are arranged in the first heating segment 221. The ends 22A and 22B are spaced apart next to each other in part of the edge of the heating target area (middle of left side in drawing). The first end 22A is connected to the outer portion 221A. The second end 22B is connected to the inner portion 221B. That is, the first heating segment 221 includes the two ends of the single strip-like heating element, and the second heating segment 222 includes the middle portion of the single strip-like heating element.

The second heating segment 222 is laid out over substantially the entire region surrounded by the first heating segment 221. The second heating segment 222 includes meandering line sections (meandering sections). The second heating segment 222 includes, for example, two meandering sections arranged in the sideward direction. The meandering sections each include straight sections 222L that extend in the sideward direction and are arranged next to one another in the vertical direction. The meandering sections also include bent parts 222E that connect the ends of the straight sections 222L arranged next to each other in the vertical direction.

The meandering sections of the second heating segment 222, which are arranged next to each other, are superposed in the meandering direction (vertical direction). Specifically, the meandering sections arranged next to each other in the sideward direction, which is a first direction, are superposed in the vertical direction, which is a second direction that is substantially orthogonal to the first direction. In other words, one bent part 222E of the right meandering section and another bent part 222E of the left meandering section are arranged alternately in the vertical direction at the middle of the second heating segment 222 with respect to the sideward direction.

Width WL of the strip-like heating element of the heating unit 22 is greater than width WP between parts of the strip-like heating element that are arranged next to each other (that is, distance between adjacent parts of strip-like heating element). Width WP between the parts of the strip-like heating element is, for example, 0.4 mm or greater to 0.6 mm or less. Width WL of the strip-like heating element is, for example, 1.4 times or greater to 1.6 times or less than width WP. Width WL of strip-like heating element is the dimension of the strip-like heating element in the direction orthogonal to the direction in which the strip-like heating element extends. Width WP between parts of the strip-like heating element is the dimension of the gap between the parallel parts of the strip-like heating element and corresponds to the dimension of the gap in the direction that is orthogonal to the direction in which the strip-like heating element extends. Width WL and width WP are the same in the first heating segment 221 and the second heating segment 222.

Operation

When current is supplied to the heating unit 22, the first heating segment 221, which continuously extends along the edge of the heating target area, generates heat at the edge. Further, in the area surrounded by the first heating segment 221, the second heating segment 222, which is meandered with parts spaced apart in the vertical direction, generates heat. Thus, heat dissipation is limited at where heat easily dissipates outward such as the edge of the heating target area. As a result, the temperature is uniform in the heating target area. In this case, width WL of the strip-like heating element is greater than width WP between the parts of the strip-like heating element. This increases the amount of heat generated per unit area and improves the heating responsiveness of the heating target area.

The above-described embodiment has the following advantages.

(1) When the planar heating element 20 is heated, the light-shielding hood 13 that faces the windshield WG, namely, the heating target area, has a uniform temperature.

(2) The heating responsiveness of the heating target area can be improved when starting the heating of the planar heating element 20. The vehicle windshield device including the planar heating element 20 will improve the driving responsiveness of the vehicle windshield device. As a result, the detection function of the vehicle windshield device will be active from when driving of the vehicle is started.

(3) The two meandering sections of the second heating segment 222, which are arranged sideward next to each other, are superposed in the meandering vertical direction. This limits decreases in the rigidity of the meandering sections that are arranged next to each other. As a result, deformation of the heating unit 22 is limited when the planar heating element 20 is manufactured or when the planar heating element 20 is installed in a vehicle windshield device. This improves the productivity of the planar heating element and the vehicle windshield device.

(4) Stainless steel, when used as a material for the heating unit 22, improves the rigidity of the strip-like heating element compared with materials such as aluminum, nickel, and copper.

(5) When the protective circuit 24 is located between the heating unit 22 and the first elastic sheet 26, the first elastic sheet 26 is deformed in conformance with the shape of the protective circuit 24. As a result, excessive deformation of the heating unit 22 is limited.

(6) When the planar heating element 20 is assembled to the bracket 11 and the camera frame 12, the shapes of the first elastic sheet 26 and the second elastic sheet 27 conform to the shapes of the bracket 11 and the camera frame 12. This improves the assembling characteristics of the planar heating element 20.

(7) The ends 22A and 22B of the strip-like heating element are located in the first heating segment 221. In other words, the strip-like heating element is laid out from a part of the edge of the heating target area into the heating target area and then out of the heating target area. This allows the ends 22A and 22B that supply current to the heating unit 22 to be concentrated at a single location. Thus, the structure required to connect the heating unit 22 to the circuit that supplies current to the heating unit 22 is simplified.

(8) Width WP between parts of the strip-like heating element is 0.4 mm or greater to 0.6 mm or less, and width WL of the strip-like heating element is 1.4 times or greater to 1.6 times or less than width WP. In this case, when the strip-like heating element is manufactured, stable dimensional precision is obtained by etching a metal foil or stamping out a metal foil.

The above-described embodiments may be modified as follows.

First Heating Segment 221

The first heating segment 221 may be a structure wound once along the edge of the heating target area or a structure wound thrice or more along the edge of the heating target area. The number of windings of the first heating segment 221 may be changed in accordance with the shape of the heating target area and/or the size of the heating target area.

Width WL of the first heating segment 221 may differ from width WL of the second heating segment 222. In addition or instead, width WP of the first heating segment 221 may differ from width WP of the second heating segment 222. In this case, the minimum value of width WL is greater than the maximum value of width WP. Advantages (1) to (8) are still obtained with such widths WL and widths WP. It is preferable that width WL of the first heating segment 221 be equal to width WL of the second heating segment 222 and that width WP of the first heating segment 221 be equal to width WP of the second heating segment 222 for the temperature to be uniform in the target area.

The edge of the heating target area does not need to be trapezoidal like the rear surface of the light-shielding hood 13. Instead, the edge may have any of a variety of two-dimensional shapes such as a circular shape, an elliptic shape, a polygonal shape, or the like. In this case, the first heating segment 221 may be arranged along the edge of the heating target area.

Second Heating Segment 222

The second heating segment 222 may include three or more meandering sections.

The first heating segment 221 may include a single strip-like heating element, and the second heating segment 222 may include a strip-like heating element that differs from the single strip-like heating element. The outer portion 221A of the first heating segment 221 may include a single strip-like heating element, and the inner portion 221B of the first heating segment 221 may include a strip-like heating element that differs from the single strip-like heating element. The meandering sections of the second heating segment 222 may each include different strip-like heating elements. However, it is preferable that the first heating segment 221 and the second heating segment 222 be integrated and share a single strip-like heating element to simplify the circuit that supplies current to the heating unit. Further, it is preferable that the outer portion 221A and the inner portion 221B be integrated and share a single strip-like heating element.

The invention claimed is:

1. A planar heating element comprising:
a planar heating unit formed by a single strip-like heating element, the heating unit including
a first heating segment located along an edge of a heating target area, and
a second heating segment located in an area entirely surrounded by the first heating segment, wherein
the second heating segment includes a plurality of meandering sections, the meandering sections arranged next to each other being superposed in a meandering direction,
the first heating segment includes an outer portion and an inner portion, the outer portion includes a first end and a second end, and extends along the edge of the heating target area, the first end of the outer portion being connected to one end of the strip-like heating element and the second end of the outer portion being connected to one end of the second heating segment,
the inner portion includes a first end and a second end, and extends along the edge of the heating target area, the first end of the inner portion being connected the other end of the strip-like heating element and the second end of the inner portion being connected to the other end of the second heating segment,
the first end of the outer portion and the first end of the inner portion are arranged next to each other at the edge of the heating target area,
the second end of the outer portion and the second end of the inner portion are arranged next to each other at the edge of the heating target area, and
the strip-like heating element has a width that is greater than a width between parts of the strip-like heating element that are arranged next to each other.

2. The planar heating element according to claim 1, wherein a material forming the strip-like heating element is stainless steel.

3. The planar heating element according to claim 1, further comprising an elastic sheet that is heat insulative, wherein the strip-like heating element is adhered to the elastic sheet.

4. The planar heating element according to claim 1, wherein the width between the parts of the strip-like heating element that are arranged next to each other is 0.4 mm or greater to 0.6 mm or less, and the width of the strip-like heating element is 1.4 times or greater to 1.6 times or less than the width between the parts of the strip-like heating element that are arranged next to each other.

5. The planar heating element according to claim 1, wherein the outer portion of the first heating segment corresponds to one end of the single strip-like heating element, wherein the inner portion of the first heating segment corresponds to the other end of the single strip-like heating element, and wherein the second heating segment corresponds to the middle portion of the single strip-like heating element.

6. The planar heating element according to claim 1, wherein the second heating segment is laid out over substantially the entire region surrounded by the first heating segment.

7. The planar heating element according to claim 1, wherein
the first end of the outer portion is a first terminal of the outer portion and is connected to one terminal end of the strip-like heating element,
the second end of the outer portion is a second terminal of the outer portion and is connected to one terminal end of the second heating segment,
the first end of the inner portion is a first terminal of the inner portion and is connected to the other terminal end of the strip-like heating element, and
the second end of the inner portion is a second terminal of the inner portion and is connected to the other terminal end of the second heating segment.

8. A vehicle windshield device, comprising:
a bracket attached to a windshield of a vehicle;
a camera unit accommodated in the bracket;
a light-shielding hood accommodated in the bracket; and
the planar heating element configured to heat the light-shielding hood, the planar heating element comprising:
a planar heating unit formed by a single strip-like heating element, the heating unit including
a first heating segment located along an edge of a heating target area, and
a second heating segment located in an area entirely surrounded by the first heating segment, wherein
the second heating segment includes a plurality of meandering sections, the meandering sections arranged next to each other being superposed in a meandering direction,
the first heating segment includes an outer portion and an inner portion,
the outer portion includes a first end and a second end, and extends along the edge of the heating target area, the first end of the outer portion being connected to one end of the strip-like heating element and the second end of the outer portion being connected to one end of the second heating segment,
the inner portion includes a first end and a second end, and extends along the edge of the heating target area, the first end of the inner portion being connected to the other end of the strip-like heating element and the second end of the inner portion being connected to the other end of the second heating segment,
the first end of the outer portion and the first end of the inner portion are arranged next to each other at the edge of the heating target area,
the second end of the outer portion and the second end of the inner portion are arranged next to each other at the edge of the heating target area, and
the strip-like heating element has a width that is greater than a width between parts of the strip-like heating element that are arranged next to each other.

9. The vehicle windshield device according to claim 8, wherein a material forming the strip-like heating element is stainless steel.

10. The vehicle windshield device according to claim 8, further comprising an elastic sheet that is heat insulative, wherein the strip-like heating element is adhered to the elastic sheet.

11. The vehicle windshield device according to claim 8, wherein the width between the parts of the strip-like heating element that are arranged next to each other is 0.4 mm or greater to 0.6 mm or less, and the width of the strip-like heating element is 1.4 times or greater to 1.6 times or less than the width between the parts of the strip-like heating element that are arranged next to each other.

12. The vehicle windshield device according to claim 8, wherein a number of bent parts of the meandering sections per a unit area of the heating target area increases as a distance from the area to a light-receiving element of the camera unit decreases.

\* \* \* \* \*